Jan. 5, 1932.  J. F. BERRY  1,840,148
VARIABLE PITCH PROPELLER FOR AIRPLANES
Filed Dec. 16, 1930  2 Sheets-Sheet 1
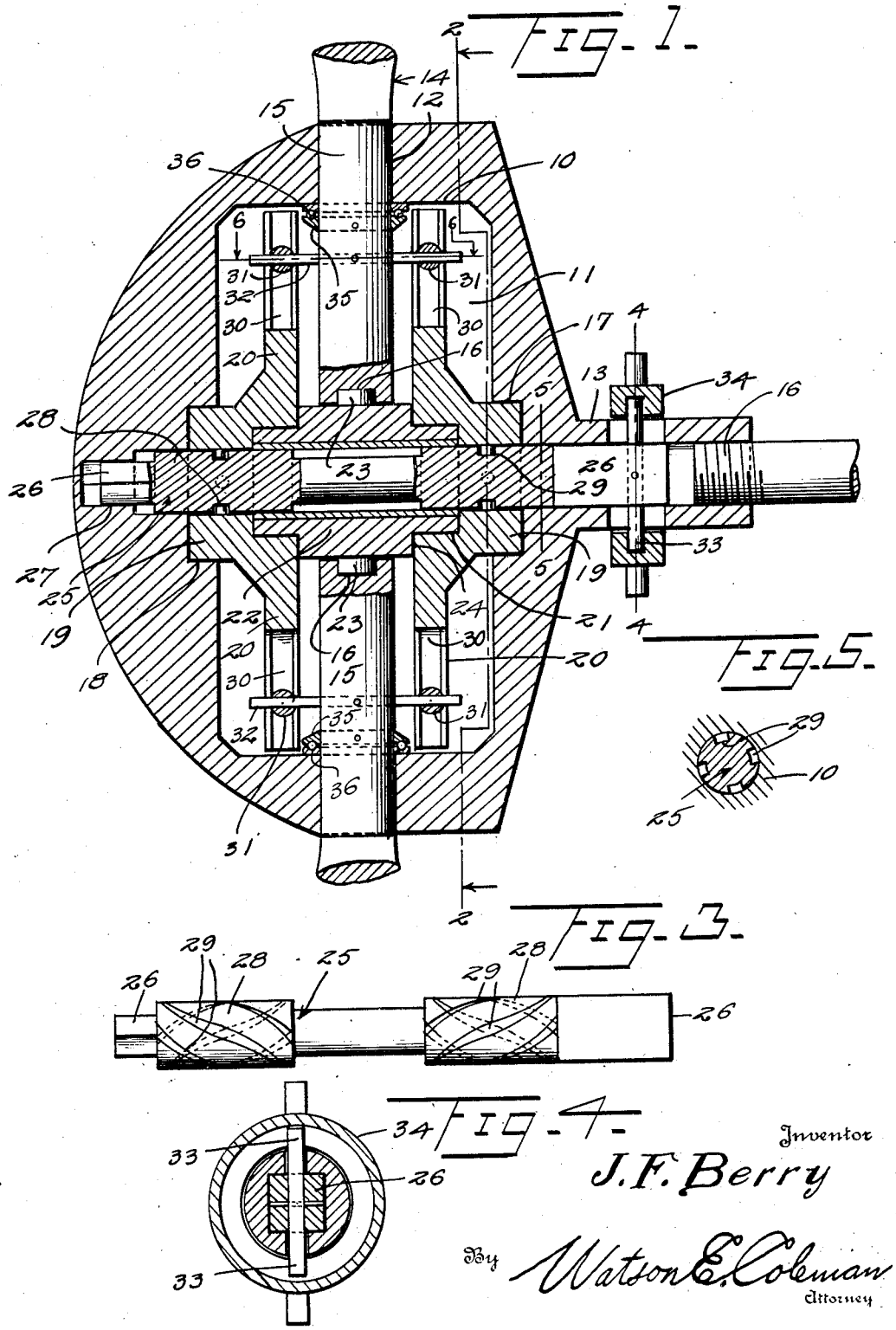
Inventor
J. F. Berry
By Watson E. Coleman
Attorney Jan. 5, 1932.  J. F. BERRY  1,840,148
VARIABLE PITCH PROPELLER FOR AIRPLANES
Filed Dec. 16, 1930  2 Sheets-Sheet 2
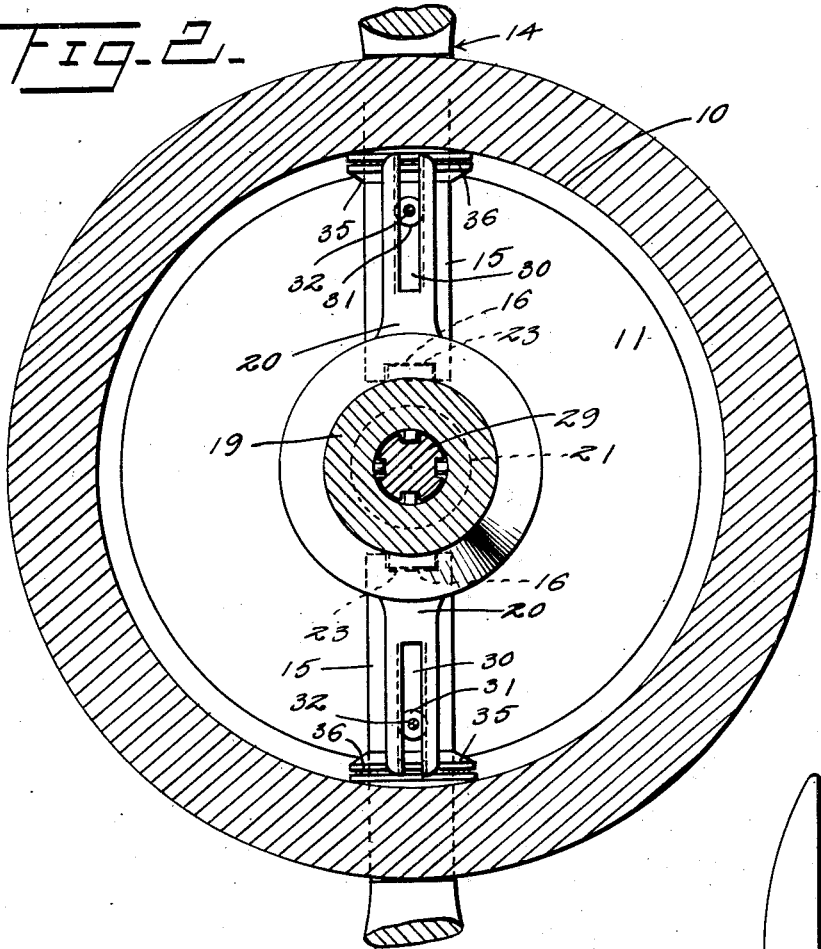
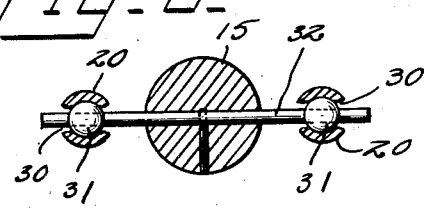
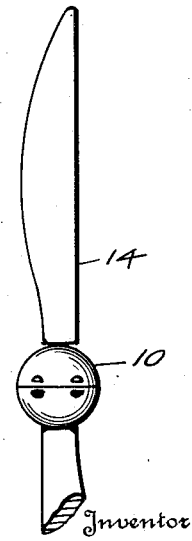
Inventor
J. F. Berry
By Watson E. Coleman
Attorney Patented Jan. 5, 1932

1,840,148

UNITED STATES PATENT OFFICE

JOHN F. BERRY, OF LEWIS, IOWA

VARIABLE PITCH PROPELLER FOR AIRPLANES

Application filed December 16, 1930. Serial No. 502,804.

This invention relates to propellers in which the pitch may be changed at the will of the operator and particularly to a variable pitch propeller designed for airplanes and in which a member shiftable longitudinally of the shaft of the propeller by means under the control of the aviator will operate to rotate the propellers in opposite directions to change that pitch to any desired degree.

The general object of the invention is to provide a structure of this character which is relatively simple and positive in its action and wherein the propellers are mounted for oscillatory movement around their axes in opposite directions, each propeller having a transversely extending pin extending through the shank of the propeller, these pins being engaged by oppositely disposed oscillatable members loosely mounted within the hub of the propeller, means being disposed within the shaft of the propeller and within the hub whereby said members may be oscillated in opposite directions upon a longitudinal movement in one direction or the other of said means.

Other objects will appear in the course of the following description.

My invention is illustrated in the accompanying drawings, wherein:—

Figure 1 is a diagrammatic section through the hub of an airplane propeller showing the shanks of the propeller blades in elevation but partly broken away;

Figure 2 is a section on the line 2—2 of Figure 1;

Figure 3 is an elevation of the actuating rod;

Figure 4 is a section on the line 4—4 of Figure 1;

Figure 5 is a section on the line 5—5 of Figure 1;

Figure 6 is a section on the line 6—6 of Figure 1;

Figure 7 is a face view of the propeller and its hub.

Referring to these drawings, 10 designates a split housing or hub which is hollow to provide a chamber 11 and which is formed at diametrically opposite points with apertures 12 through which the shanks of the two propellers may be disposed. The hub 10 is formed with the tubular shaft 13 adapted to be connected to the driving shaft of the propeller in any suitable manner or formed as part thereof.

The propellers 14 have shanks 15 which extend through the apertures 12 and into the interior of the hub and rotate each upon a longitudinal axis transverse to the rotational axis of the hub itself. Each shank 15 at its inner end is formed with a cylindrical socket 16. The hub 10 is formed with the opposed cylindrical recesses 17 and 18. Within these recesses are disposed the outwardly projecting bearings of annular members 19 having two pairs of arms 20. It will be understood that two arms 20 project in diametrically opposite directions from the annular members 19. Each annular member 19 is formed with a socket or recess 21 at its center to receive and rotate upon a medially disposed block or member 22 constituting a spacer for the annuli 19 and a spacer for the inner ends of the shanks 15. The opposite portions of the member 22 are provided with the outwardly projecting cylindrical portions 23 which engage within the sockets 16 formed on the inner ends of the shanks 15, thus supporting the propellers at their inner ends for rotation or oscillation around the longitudinal axes of the propeller shanks. The member 22 is also formed with shoulders 24 which bear against the inside faces of the annuli 19, thus holding these annuli spaced from each other. This member 22 also forms a guide for a longitudinally shiftable actuating rod designated generally 25 which extends through the annuli 19 of arms 20 and extends through the center of the member 22. This sliding rod at its outer end is formed with a square head or many-sided head 26 which fits within a many-sided recess 27 formed in the outer end of the hub 10 so that this rod 25 rotates with the hub, but may have longitudinal sliding movement with relation thereto. This rod 25 extends through the centers of the annuli 19 and into the tubular shaft portion 13 and this inner end of the rod 25 is also many-sided as at 26 to fit the many-sided opening or bore in the shaft section 13. On each side of the middle of the rod 25, the rod is formed with the relatively reversed screw-threads 28 and 29. Each annulus 19 is toothed or threaded for engagement with the threads 28 and 29. Thus it will be obvious that when the rod 25 is moved toward the left in Figure 1, the annulus and arms 20 on the forward end of the propeller will be given a rotational movement in one direction while the other hub and its arms will be given a rotational movement in the reverse direction. Thus as the actuating rod 25 is shifted in one direction or the other, these annuli 19 with their arms 20 will be reversely rotated with relation to each other.

The extremities of the arms 20 are longitudinally slotted as at 30. The walls of this slot are transversely concave as shown in Figure 6 and disposed within each slot 30 is a ball 31 capable of rotary movement in the slot and of travel longitudinally through the slot.

Through each shank 15 passes a pin 32, each pin passing through the balls 31 in relatively opposite arms 20 as shown in Figure 1 and thus it will be obvious that as the annuli 19 are rotated in relatively opposite directions by a longitudinal shifting movement of the rod 25, the pins 32 will be rotated, one end of the pin moving in one direction and the other in the other direction and this will rotate the corresponding shanks of the propellers so that these propellers will be always rotated in opposite directions. The pins 32 are, of course, slidingly mounted within the balls 31 and the balls slidingly and rotatively mounted within the slots 30, thus giving free movement of the parts. The rod 25 has extending through it a pin or like element 33 which extends through opposite slots in the tubular shaft 13, the ends of this pin extending into a collar 34, this collar being connected to any suitable means whereby the collar may be shifted toward or from the hub 10 while the pin 33 is rotating with the shaft and with the rod 25 to thus provide means whereby the rod 25 may be shifted longitudinally while the shaft is rotating. I have not illustrated the particular means whereby the collar may be shifted by the aviator, as it is obvious that many different means may be provided for this purpose.

In order to hold the shanks of the propellers in position within the hub 10, I may provide these shanks with the thrust collars 35 bearing against anti-friction bearings 36 carried within the hub 10 and surrounding the shanks of the propellers. This hub 10, as before stated, will preferably be split and held together by bolts in an obvious manner.

It will be seen that this construction provides a very simple means whereby the propellers may be rotated, each around its own axis and in reverse directions to thereby change the pitch of the propeller blades and that as the rod 25 is shifted forward from a neutral position, the propellers will be rotated in one direction to reduce their angles of incidence and when the rod is shifted in the reverse direction to the neutral position to increase their angles of incidence, the neutral position being one in which the propellers have their usual pitch. It will be seen that a relatively slight longitudinal movement of the rod 25 will cause a sufficient rotation of the propellers in either direction to effectively change the pitch. All of the mechanism rotates with the hub 10 and with the propellers so that no strain comes upon the mechanism due to torsion and the propellers are fully supported against the thrust exerted against them.

I claim:—

1. A variable pitch propeller including a hollow hub, a hollow driving shaft, propeller blades having their shanks extending into the hollow hub and rotatable within the hub around their longitudinal axes, a longitudinally shiftable propeller adjusting rod disposed within the hollow shaft and rotating therewith, and being longitudinally shiftable with relation thereto, oppositely disposed members rotatably mounted within the hub and through which said rod passes, means on the rod for rotating said members in opposite directions upon a longitudinal movement of the rod from a neutral position in either direction, transverse pins passing through the shank of each propeller and engaging said members, whereby a rotation of the members in opposite directions will cause a rotation of the shanks of the propellers in opposite directions.

2. A variable pitch propeller including a hollow hub and a hollow driving shaft, propeller blades having their shanks disposed within the hub and rotatable within the hub around their own axes, members supporting the inner ends of the propellers and permitting the rotation of the propeller shanks, a propeller adjusting rod disposed within the hollow shaft and hub and rotating therewith and longitudinally shiftable with relation thereto, the rod having two screw-threaded portions reversely threaded with relation to each other, members rotatably disposed within the hub and having interiorly screw-threaded apertures through which said rod passes, the screw-threads on the members meshing with the screw-threads on the rod, whereby as the rod is shifted longitudinally, the said members will be rotated in opposite directions, a pin extending through the shank of each propeller, each of said members having slots within which the ends of said pins are received.

3. A variable pitch propeller including a hollow hub and a hollow driving shaft, propeller blades having their shanks disposed within the hub and rotatable within the hub around their own axes, members supporting the inner ends of the propellers and permitting the rotation of the propeller shanks, a propeller adjusting rod disposed within the hollow shaft and hub and rotating therewith and longitudinally shiftable with relation thereto, the rod having two screw-threaded portions reversely threaded with relation to each other, members disposed rotatably within the hub and having interiorly screw-threaded apertures through which said rod passes, the screw-threads on the members meshing with the screw-threads on the rod, whereby as the rod is shifted longitudinally, the said members will be rotated in opposite directions, a pin extending through the shank of each propeller, each of said members having slots within which the ends of said pins are received, said slots extending longitudinally of the members and sliding elements disposed in said slots and through which said pins pass.

4. A removable pitch propeller including a hollow hub and a hollow driving shaft, propeller blades having their shanks extending into the hollow hub, and rotatable therein around their axes, a propeller adjusting rod disposed axially within the hollow shaft and hub and rotatably engaged therewith but shiftable longitudinally independently thereof, said rod having two relatively reversely screw-threaded portions, two pairs of arms disposed within the hollow hub, one on each side of the propeller shanks, each pair of arms having a central annulus rotatably mounted in the main hub and concentric to the shaft, each annulus having an interiorly screw-threaded passage through which said rod passes and with the threads of which the threads on the rod engage, each of said arms adjacent its extremity being longitudinally slotted, a sliding ball disposed within the slot of each arm and rotatable and slidable therein, and pins passing through the shanks of the propellers and engaging balls in opposite arms.

5. A removable pitch propeller including a hollow hub and a hollow driving shaft, propeller blades having their shanks extending into the hollow hub, and rotatable therein around their axes, a propeller adjusting rod disposed axially within the hollow shaft and hub and rotatably engaged therewith but shiftable longitudinally independently thereof, said rod having two relatively reversely screw-threaded portions, two pairs of arms disposed within the hollow hub, one on each side of the propeller shanks, each pair of arms having an annular member rotatably mounted in the main hub and concentric to the shaft, each annulus having an interiorly screw-threaded passage through which said rod passes and with the threads of which the threads on the rod engage, each of said arms adjacent its extremity being longitudinally slotted, a sliding ball disposed within the slot of each arm and rotatable and slidable therein, and pins passing through the shanks of the propellers and engaging balls in opposite arms, each annulus being recessed upon its inner face, and a spacing member surrounding said rod and having its ends inserted into said annuli, said spacing member having shoulders limiting the inward movement of the annuli toward each other and having bearings for the inner ends of the propeller shanks.

6. A variable pitch propeller including a hollow hub and a hollow driving shaft, blades having their shanks extending radially into the hollow hub and rotatable therein around their own axes, a propeller adjusting rod disposed within the hollow shaft and hub, the ends of said rod being many-sided and the hub having a many-sided socket at its front and rear end into which the many-sided ends of said rod are engaged for rotation therewith, said rod being longitudinally shiftable through the shaft and hub, and said rod having two reversely screw-threaded portions spaced from each other, annular members disposed one on each side of the propeller shanks, the inner faces of the main hub being recessed to receive said annular members, a pair of radial arms extending in opposite directions from each member, the arms being longitudinally slotted at their ends, balls disposed in said slots, pins extending through the propeller shanks and into the balls of opposite arms, and a spacing member disposed between the inner ends of the propeller shanks and between said annular members and spacing them apart and forming a bearing therefor and for the propeller shanks, said spacing member being hollow to permit the passage of the actuating rod, and means operatively engaged with the actuating rod whereby it may be shifted longitudinally while the hub shaft and rod are rotating.

7. A variable pitch propeller including a hollow hub and a hollow driving shaft, blades having their shanks extending radially into the hollow hub and rotatable therein around their own axes, a propeller adjusting rod disposed within the hollow shaft and hub, the ends of said rod being many-sided and the hub having a many-sided socket at its front and rear end into which the many-sided ends of said rod are engaged for rotation therewith, said rod being longitudinally shiftable through the shaft and hub, and said rod having two reversely-screw-threaded portions spaced from each other, annular members threaded to engage the screw-threads on the rod, the inner faces of the main hub being recessed to receive said members, a pair of radial arms extending in opposite directions from each member, the arms being longitudinally slotted at their ends, balls disposed in said slots, pins extending through the propeller shanks and into the balls of opposite arms, and a spacing member disposed between the inner ends of the propeller shanks and between said annular members and spacing them apart and forming a bearing therefor and for the propeller shanks, said spacing members being hollow to permit the passage of the actuating rod, and means operatively engaged with the actuating rod whereby it may be shifted longitudinally while the hub, shaft and rod are rotating and including a pin passing transversely through said actuating rod and through the tubular shaft, the shaft being slotted for said pin to permit the pin to be shifted longitudinally, and an element held from rotation, but within which the pin rotates freely, said element having means whereby it may be shifted longitudinally to thereby shift the pin and rod.

8. A variable pitch propeller including a hollow hub, a hollow driving shaft, propeller blades having their shanks extending radially into the hollow hub and each axially rotatable within the hub, a longitudinally shiftable propeller adjusting rod disposed within the shaft and rotatable therewith but being longitudinally shiftable with relation thereto, a member rotatively mounted within the hub and through which said rod passes, means on the rod for rotating said member in one direction or the other upon a longitudinal movement of the rod from a neutral position in either direction, and transverse pins passing through the shank of each propeller and engaging said member whereby a rotation of the member in opposite directions will cause a like rotation of the propeller blades.

9. A variable pitch propeller including a hub, propeller blades mounted upon the hub for rotation therewith, each blade being independently oscillatable about its own longitudinal axis, a longitudinally shiftable propeller adjusting rod extending through the center of the hub and rotating therewith and being longitudinally shiftable with relation thereto, an annular member mounted upon said rod and extending outward parallel to the propeller shanks, means on said rod for oscillating said annular member in opposite directions as the rod is moved in one or the other directions, and transverse pins passing through the shank of each propeller and engaging said annular member whereby a rotation of the member in opposite directions will cause a rotation of the shanks of the propellers in opposite directions.

10. A variable pitch propeller including an annular hub, propeller blades having their shanks mounted in the hub for rotation therewith, each propeller shank being mounted for rotation around its own axis, a longitudinally shiftable propeller adjusting rod extending through the hollow hub, an annular member rotatably mounted on the hub and through which said rod passes, the rod being provided with screw-threads and the annular member having threads engaging therewith whereby as the rod is shifted longitudinally in one direction or the other, said member will be rotated in one direction or the other, and a pin extending through the shank of each propeller and engaging said annular member.

In testimony whereof I hereunto affix my signature.

JOHN F. BERRY.